United States Patent
Ohmiya et al.

(10) Patent No.: US 10,445,139 B2
(45) Date of Patent: Oct. 15, 2019

(54) CONTROL SYSTEM IN WHICH COMMUNICATION BETWEEN DEVICES IS CONTROLLED BASED ON EXECUTION CONDITION BEING SATISFIED, GATEWAY DEVICE USED IN THE CONTROL SYSTEM, AND CONTROL METHOD FOR THE CONTROL SYSTEM

(71) Applicant: Hitachi, Ltd., Chiyoda-ku, Tokyo (JP)

(72) Inventors: Masahiro Ohmiya, Tokyo (JP); Daisuke Yokota, Tokyo (JP); Katsuto Shimizu, Tokyo (JP); Naohiko Irie, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 15/301,740

(22) PCT Filed: Mar. 13, 2015

(86) PCT No.: PCT/JP2015/057402
§ 371 (c)(1),
(2) Date: Oct. 4, 2016

(87) PCT Pub. No.: WO2015/156083
PCT Pub. Date: Oct. 15, 2015

(65) Prior Publication Data
US 2017/0024253 A1  Jan. 26, 2017

(30) Foreign Application Priority Data
Apr. 9, 2014  (JP) .................................. 2014-080137

(51) Int. Cl.
*G06F 9/46* (2006.01)
*G06F 9/48* (2006.01)
(Continued)

(52) U.S. Cl.
CPC .......... *G06F 9/4887* (2013.01); *G06F 16/219* (2019.01); *G06F 16/22* (2019.01); *H04L 12/6418* (2013.01)

(58) Field of Classification Search
CPC . H04L 12/6418; G06F 9/4887; G06F 16/219; G06F 16/22
See application file for complete search history.

(56) References Cited

U.S. PATENT DOCUMENTS 6,408,328 B1 * 6/2002 Haury ...................... G06F 9/54
709/201
6,941,340 B2 * 9/2005 Kim .................... H04L 12/2803
709/203
(Continued)

FOREIGN PATENT DOCUMENTS

JP   2002-16614 A    1/2002
JP   2003-244187 A   8/2003
(Continued)

OTHER PUBLICATIONS

International Search Report (PCT/ISA/210) issued in PCT Application No. PCT/JP2015/057402 dated May 19, 2015 with English translation (5 pages).
(Continued)

*Primary Examiner* — Van H Nguyen
(74) *Attorney, Agent, or Firm* — Crowell & Moring LLP

(57) ABSTRACT

In a control monitoring system in which an information system is connected with a control system, the control system includes a control device that performs at least one of control and monitoring of a control target, a computer that performs a process related to the control or the monitoring, and a gateway device that relays a communication message between the control device and the computer. The gateway device acquires a predetermined state index related to a first communication message when the first communication message is received from the computer, determines whether or not a predetermined execution condition is satisfied based on the state index, transmits a second communication message based on the received first communication message to the
(Continued)

control device when the execution condition is satisfied, and does not transmit the second communication message to the control device when the execution condition is not satisfied.

8 Claims, 9 Drawing Sheets

(51) Int. Cl.
*G06F 16/22* (2019.01)
*G06F 16/21* (2019.01)
*H04L 12/64* (2006.01)

(56) References Cited

U.S. PATENT DOCUMENTS

| | | | | |
|---|---|---|---|---|
| 8,176,532 | B1* | 5/2012 | Cook | H04L 63/10 |
| | | | | 726/11 |
| 9,300,559 | B2* | 3/2016 | Kim | H04L 43/0858 |
| 9,906,492 | B2* | 2/2018 | Morita | H04L 63/02 |
| 2003/0117298 | A1 | 6/2003 | Tokunaga et al. | |
| 2008/0219274 | A1 | 9/2008 | Kato et al. | |
| 2013/0219170 | A1* | 8/2013 | Naitou | H04L 63/0428 |
| | | | | 713/153 |

FOREIGN PATENT DOCUMENTS

| | | |
|---|---|---|
| JP | 2008-193572 A | 8/2008 |
| JP | 2008-227798 A | 9/2008 |
| JP | 2009-42995 A | 2/2009 |
| JP | 2009-253803 A | 10/2009 |
| JP | 2011-24010 A | 2/2011 |
| JP | 2012-101788 A | 5/2012 |
| WO | WO 2010/140193 A1 | 12/2010 |

OTHER PUBLICATIONS

Japanese-language Written Opinion (PCT/ISA/237) issued in PCT Application No. PCT/JP2015/057402 dated May 19, 2015 (4 pages).

* cited by examiner

CONTROL SYSTEM IN WHICH COMMUNICATION BETWEEN DEVICES IS CONTROLLED BASED ON EXECUTION CONDITION BEING SATISFIED, GATEWAY DEVICE USED IN THE CONTROL SYSTEM, AND CONTROL METHOD FOR THE CONTROL SYSTEM

TECHNICAL FIELD

The present invention relates to a control monitoring system that has a configuration in which a plurality of systems are connected via a gateway device and performs monitoring and control of a control monitoring target.

PTL 1 discloses a technique in which in an in-vehicle gateway device that connects different networks such as an information system network and a control system network of a vehicle with each other, a configuration of each of the information system network and the control system network is stored and managed. For example, the in-vehicle gateway device checks whether or not there is a change in a configuration of the control system network based on configuration management information of the control system network of a transmission destination when a message is received from the information system network. Then, when there is a change, the in-vehicle gateway device updates a policy of the message to a policy according to a new configuration, converts the message, and transmits the converted message to the control system network.

PTL 2 discloses a technique in which a gateway server located between an information system network and a control system network relays data access from the information system network to the control system network, and an information-system device can perform data access using the same method even when a control-system device that practically performs control is switched.

CITATION LIST

Patent Literature

PTL 1: JP 2012-101788 A
PTL 2: JP 2009-42995 A

SUMMARY OF INVENTION

Technical Problem

In a control monitoring system that includes an information system configured with computers and a control system configured with control devices and processes a command through communication between the information system and the control system, when the control device executes a command, there are cases in which it is unable to execute a command under a condition assumed in the control system.

For example, there are cases in which it is unable to perform control on a monitoring control target under a condition assumed in the control system. When the control device of the control system processes a command, communication with the computer of the information system occurs, but since the information system and the control system differ in communication performance or a communication quality, or the control device does not detect a configuration of the information system and is not aware of the computer in which data or a service is implemented in advance, it occurs.

In order to prevent it, for example, it is necessary to evaluate a communication path between the information system and the control system or manage a location of data and a service in the information system in advance when the information system and the control system are connected or when device information of a control monitoring target is connected, but it increases a cost.

It is an object of the present invention to provide a technique capable of executing a command under a predetermined condition at a low cost when a control monitoring system in which an information system and a control system are connected controls and monitors a control monitoring target.

Solution to Problem

In order to solve the above issue, a control system according to an aspect of the present invention includes: a control device that performs at least one of control and monitoring of a control target; a computer that performs process related to the control or the monitoring; and a gateway device that relays a communication message between the control device and the computer, wherein when a first communication message is received from the computer, the gateway device acquires a predetermined state index related to the first communication message, determines whether or not a predetermined execution condition is satisfied based on the state index, transmits a second communication message to the control device based on the received first communication message when the execution condition is satisfied, and does not transmit the second communication message to the control device when the execution condition is not satisfied.

Advantageous Effects of Invention

According to the present invention, it is possible to provide a technique capable of executing a command under a predetermined condition at a low cost when a control monitoring system in which an information system and a control system are connected controls and monitors a control monitoring target.

DESCRIPTION OF EMBODIMENTS

First, an exemplary embodiment of the present invention will be schematically described.

Figure 1:
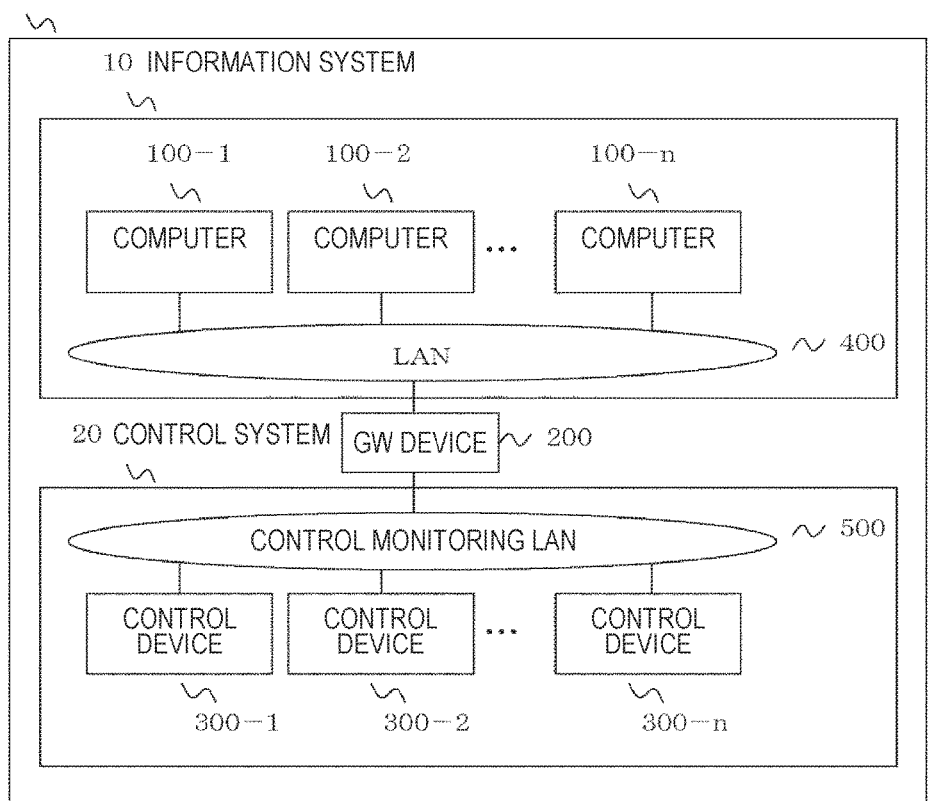
FIG. 1 is a block diagram illustrating a control system according to the present embodiment.

FIG. 1 is a block diagram illustrating a control system according to the present embodiment. A communication network system 1 includes an information system 10, a control system 20, and a gateway (GW) device 200 as illustrated in FIG. 1.

The information system 10 is configured with a plurality of computers 100-1 to 100-n and a Local Area Network (LAN) 400, and the computers 100-1 to 100-n are connected with the GW device 200 via the LAN 400. Each of the computers 100-1 to 100-n is a general computer such as a personal computer or a work station, and performs a process related to control or monitoring of a control target. The LAN 400 is a network to which the computers are connected.

The control system 20 is configured with a plurality of control devices 300-1 to 300-n and a control monitoring LAN 500, and the control devices 300-1 to 300-n are connected with the GW device 200 via the control monitoring LAN 50. The control device 300 is a controller that controls a control target or an operation control device or a measuring device that monitors a control target such as a sensor. The control monitoring LAN 500 is a network to which the control device 300 is connected.

The GW device 200 is a device that relays a communication message between the LAN 400 and the control monitoring LAN 500.

In FIG. 1, a plurality of computers 100-1 to 100-n and a plurality of control devices 300-1 to 300-n are illustrated, but it is an example. The number of computers 100 and the number of control devices 300 may be one or more.

In FIG. 1, one information system 10 and one control system 20 are illustrated, but it is an example. The number of information systems 10 and the number of control system 20 may be two or more. In this case, the systems are connected with each other via the GW device 200.

Figure 2:
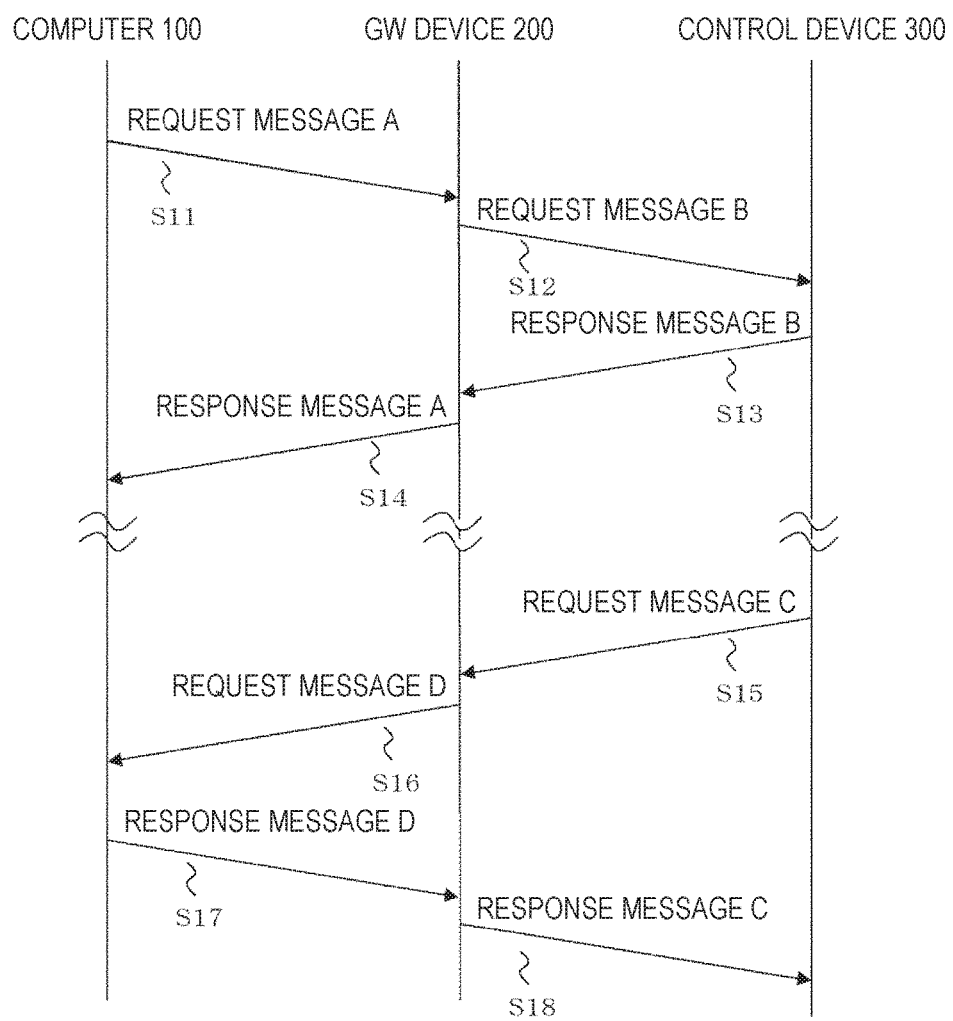
FIG. 2 is a sequence diagram illustrating a basic control/monitoring process sequence in a communication network system 1 according to the present embodiment.

FIG. 2 is a sequence diagram illustrating a basic control/monitoring process sequence in the communication network system 1 according to the present embodiment. In FIG. 2, a normal process sequence among, the computer 100, the GW device 200, and the control device 300 is illustrated. In FIG. 2, an ellipsis indicated by a wavy line indicates that a process sequence before the wavy line and a process sequence after the wavy line are separate.

First, a sequence illustrated above the wavy line when the computer 100 requests the control device 300 to perform a process will be described. For example, this sequence corresponds to a case in which the computer 100 instructs the control device 300 to perform control on a control target.

The computer 100 transmits a request message A to the GW device 200 (S11). The GW device 200 that has received the request message A transmits a request message B to the control device 300 as relay transfer based on the request message A (S12).

The control device 300 that has received the request message B transmits a response message B to the GW device 200 as a response to the request message B (S13). The GW device 200 that has received the response message B transmits a response message A serving as a response to the request message A to the computer 100 as the relay transfer based on the response message B (S14).

Next, a sequence illustrated below the wavy line when the control device 300 requests the computer 100 to perform a process will be described. For example, this sequence corresponds to a case in which the control device 300 acquires state information from the control target, notifies the computer 100 of the state information, and requests the computer 100 to perform a process on the state.

The control device 300 transmits a request message C to the GW device 200 (S15). The GW device 200 that has received the request message transmits a request message C to the computer 100 as the relay transfer based on the request message C (S16). The computer 100 transmits a response message C to the GW device 200 as a response to the request message C (S17). The GW device 200 that has received the response message transmits a response message C to the control device 300 as response to the request message C based on the response message (S18).

The basic process sequence in the communication network system 1 is illustrated in FIG. 2, and in the present embodiment, the following process is further performed.

Upon receiving a first communication message from the computer 100, When the SW device 200 acquires a predetermined state index related to the first communication message, and determines whether or not a predetermined execution condition is satisfied based on the state index. For example, the first communication message is a communication message (the request message A) for requesting control on the control target by the control device 300 or a communication message (the response message D) serving as a response to a communication message used for which the control device 300 to notify the computer 100 of monitoring information acquired by monitoring of the control target. The GW device 200 transmits a second communication rites sage to the control device 300 based on the received first communication message when the execution condition is satisfied, and does not transmit the second communication message to the control device 300 when the execution condition is not satisfied. For example, the second communication message is a communication message for relaying content of the first communication message and includes all or a part of information included in the first communication message. Example of the second communication message include the request message B based on the request message A and the response message C based on the response message D. Accordingly, since the GW device 200 determines whether or not the execution condition is satisfied based on the state index acquired when the communication message is received prior or evaluation and the communication path between the LAN 400 and the control monitoring LAN 500 in advance and configuration management are unnecessary, and it can be guaranteed that a command is executed under a predetermined condition at a low cost.

At this time, the GW device 200 may set a differential average threshold value serving as a threshold value for a differential average value serving as an average value of a predetermined number of previous differences between previous index and a current state index in advance, acquire the state index when the first communication message is received from the computer 100, record the acquired state index in a history database (not illustrated), and calculate a differential average value for the state index using information stored in the history database. Then, when the differential average value does not exceed the differential average threshold value, the GW device 200 may determine the execution condition to be satisfied. Accordingly, the GW device 200 can easily guarantee that the command is executed under a predetermined condition by comparing the average value of the differences (variations) between the previous state index and the current state index.

The GW device 200 may measure a communication period of time serving as a period of time until the first communication message serving as the response communication message corresponding to a third communication message is received from the computer 100 after the third communication message is transmitted to the computer 100 as the state index. For example, the first communication message is the response communication message (the response message D) that is transmitted from the computer 100 in response to the third communication message (the request message D) serving as the communication message of the monitoring information of the control target transmitted from the GW device 200 to the computer 100. Preferably, the GW device 200 determines the execution condition to be satisfied when the measured communication period of time does not exceed a predetermined communication period of time threshold value, and determines the execution condition to be satisfied when the communication period of time exceeds the communication period of time threshold value. Accordingly, the GW device 200 can easily guarantee that the command is executed under a predetermined condition by comparing the period of time necessary for communication with the computer 100 with the threshold value.

At this time, for example, when the control device 300 performs temporary communication, the control device 300 may add an exclusion flag (a temporary flag) to a fourth communication message serving as the communication message and transmit the resulting communication message to the GW device 200. When the exclusion flag is detected, the GW device 200 may transmit the second communication message to the control device 300 regardless whether or not the communication period of time from the transmission of the third communication message based on the fourth communication message to the reception of the first communication message exceeds the communication period of time threshold value. For example, the fourth communication message is the communication message (the request message C) of the monitoring information of the control target transmitted from the control device 300 to the GW device 200. Accordingly, the control device 300 can transmit the communication message to be relayed with no determination in the GW device 200. For example, when the temporary communication is performed, the control device 300 can exclude the communication from a determination target in the GW device 200.

The computer 100 may measure a processing load amount applied to its own device when the first communication message (the request message A and the response message D) is generated, when the processing load amount exceeds a predetermined processing load threshold value, the computer 100 may add a performance flag to the first communication message as the state index, and transmit the resulting communication message to the GW device 200. In this case, when the first communication message is received, and the performance flag is detected, the GW device 200 may determine the execution condition not to be satisfied. Accordingly, since the computer 100 measures the processing load and adds a measurement result to the communication message, the GW device 200 can easily guarantee that the command is executed under a predetermined condition.

In this case, the processing load amount may be a CPU usage rate, and the processing load threshold value may be a CPU usage rate threshold value serving as a threshold value of the CPU usage rate. Accordingly, since the computer 100 measures the CPU usage rate and adds a measurement to the communication message, the GW device 200 can easily guarantee that the command is executed under a predetermined condition.

An overview of the present embodiment has been described above, and the present embodiment will be described below in further detail.

Figure 3:
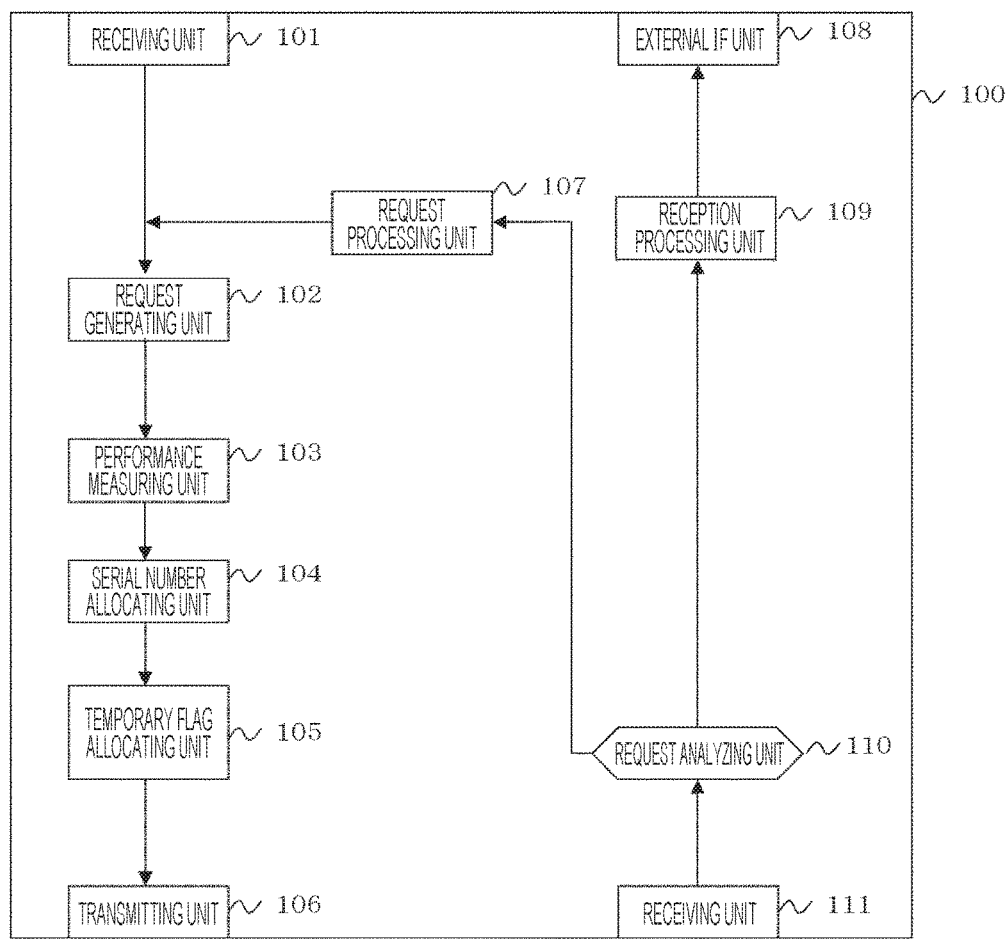
FIG. 3 is a block diagram illustrating an example of a functional configuration of a computer 100.

FIG. 3 is a block diagram illustrating an example of a functional configuration of the computer 100. The computer 100 includes a receiving unit 101, a request generating unit 102, a performance measuring unit 103, a serial number allocating unit 104, a temporary flag allocating unit 105, a transmitting unit 106, a request processing unit 107, an external interface (IF) unit 108, a reception processing unit 109, a request analyzing unit 110, and a receiving unit 111 as illustrated in FIG. 3.

The receiving unit 101 receives an instruction from the user through an input device (not illustrated) such as a keyboard or a mouse. The request generating unit 102 generates the request message A or the response message D which is transmitted from the computer 100 to the GW device 200.

When the message generated by the request generating unit 102 is the response message D, the performance measuring unit 103 measures the CPU usage rate, a storage disk usage rate, or the like, and allocates the performance flag of the response message D, that is, sets a value of the performance flag to true when a performance measurement value exceeds an allowable value. It is assumed to be possible for the user to arbitrarily change a measurement item or the allowable value.

The serial number allocating unit 104 allocates a serial number to the request message A and the response message D. The serial number is configured with consecutive integers and used for detection of packet loss or communication delay on a communication path.

When the request message A or the response message D is a message of temporary communication, the temporary flag allocating unit 105 allocates the temporary flag, that is, sets a value of the temporary flag to true. For example, the temporary communication is temporary communication for a test or communication performed in a temporary system configuration. Based on the state (value) of the temporary flag, a different condition is used in determination whether or not the GW device 200 performs a relay. For example, a communication message in which the temporary flag is true is relayed even when a communication message in which the temporary is false is not relayed.

The transmitting unit 106 transmits the generated request message A and the response message D to the LAN 400.

The request processing unit 107 performs a process according to request content included in the request message D.

The external IF unit 108 notifies the user of content of the response message A through an output device (not illustrated) such as a monitor or a speaker.

The reception processing unit 109 processes the response message A received by the receiving unit 111, and transfers content to the external IF unit 108.

The request analyzing unit 110 analyzes content of a communication message received by the receiving unit 111, requests the request processing unit 107 to process the message when the communication message is the request message D, and request the reception processing unit 109 to receive the communication message when the communication message is the response message A.

The receiving unit 111 receives the response message A. or the request message D from the LAN 400.

Figure 4:
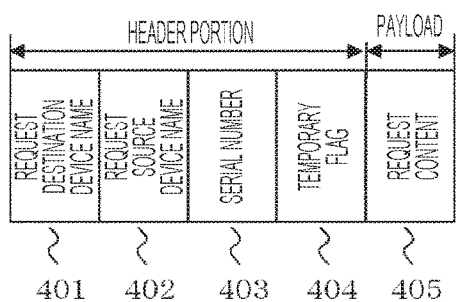
FIG. 4 is a diagram illustrating a format of a request message A transmitted from a computer 100 to a GW device 200.

FIG. 4 is a diagram illustrating a format of the request message A transmitted from the computer 100 to the GW device 200. The request message A includes a header portion and a payload. The header portion of the request message A includes a request destination device name 401, a request source device name 402, a serial number 403, and temporary flag 404.

The request destination device name 401 is a device name of a transmission destination of the request message A. The request source device name 402 is a device name of a transmission source of the request message A. The serial number 403 is a serial number of the request message A. The temporary flag 404 is a flag indicating whether or not the request message A is the temporary communication.

The payload of the request message A includes request content 405. The request content 405 is content which the device of the request source device name 402 requests the device of the request destination device name 401 to do.

Figure 5:
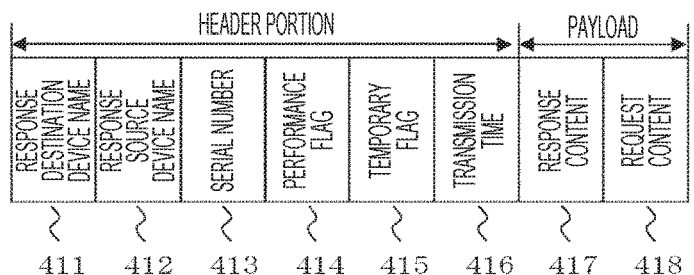
FIG. 5 is a diagram illustrating a format of a response message D transmitted from a computer 100 to a GW device 200.

FIG. 5 is a diagram illustrating a format of the response message D transmitted from the computer 100 to the GW device 200. The response message D includes a header portion and a payload.

The header portion of the response message D includes a response destination device name 411, a response source device name 412, a serial number 413, a performance flag 414, a temporary flag 415, and a transmission time 416.

The response destination device name 411 is a device name of a transmission destination of the response message D. The response source device name 412 is a device name of a transmission source of the response message D. The serial number 413 is a serial number of the response message D. The performance flag 414 is a flag indicating whether or not the computer 100 is in a high load state when the request message D is processed. When the performance flag 414 is true, it indicates that the computer 100 is in the high load state.

The payload of the response message D includes response content 417 and request content 418. The response content 417 is content which the device of the response source device name 412 responds to the request content 418 from the device of the response destination device name 411. The request content 418 is content of a process which the device of the response destination device name 411 requests the device of the response source device name 412 to perform.

Figure 6:
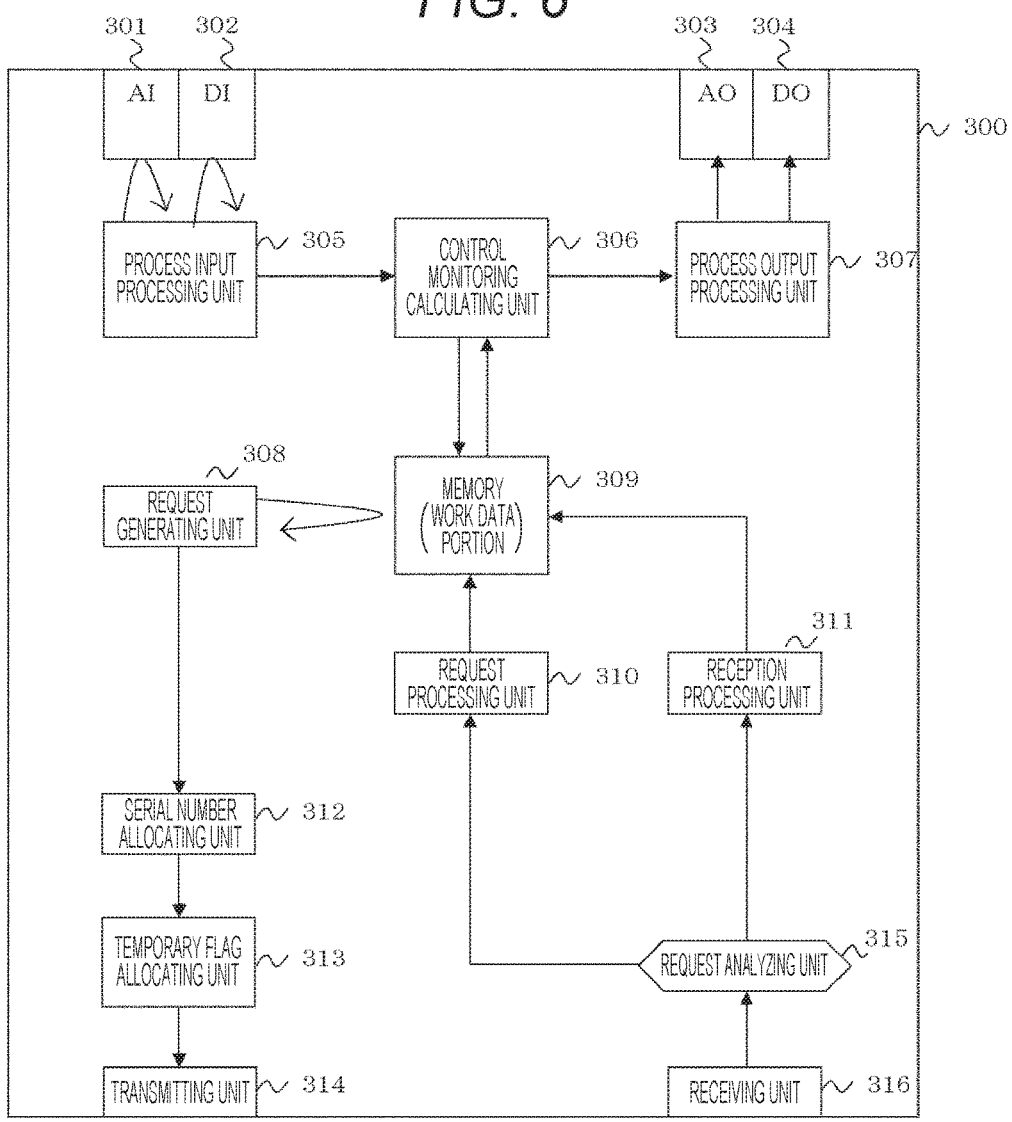
FIG. 6 is a block diagram illustrating an example of a functional configuration of a control device 300.

FIG. 6 is a block diagram illustrating an example of a functional configuration of the control device 300. The control device 300 includes an analog input (AI) 301, a digital input (DI) 302, an analog output (AO) 303, a digital output (DO) 304, a process input processing unit 305, a control monitoring calculating unit 306, a process output processing unit 307, a request generating unit 308, a memory (a work data portion) 309, a request processing unit 310, a reception processing unit 311, a serial number allocating unit 312, a temporary flag allocating unit 313, a transmitting unit 314, a request analyzing unit 315, and a receiving unit 316 as illustrated in FIG. 6.

The AI 301 is an interface for acquiring an analog value of the monitoring information from the control target. The DI 302 is an interface for acquiring a digital value of the monitoring information from the control target. The AO 303 is an interface of outputting an analog control value to the control target and performs control. The DO 304 is an interface of outputting a digital control value to the control target and performs control.

The process input processing unit 305 acquires data of the AI 301 and the DI 302 with a set sampling cycle, and transfers the acquired data to the control monitoring calculating unit 306.

The control monitoring calculating unit 306 acquires input data from the process input processing unit 305 or the memory (the work data portion) 309, performs a calculation according to the input data, stores a request in the memory (the work data portion) 309 when a calculation result includes a request or a response to the computer 100, and transfers data to the process output processing unit 307 when the calculation result does not include a request to the computer 100.

The process output processing unit 307 acquires data from the control monitoring calculating unit 306, and outputs the analog control value or the digital control value to the control target via the AO 303 or the DO 304.

The request generating unit 308 acquires data in the memory (the work data portion) 309 with a set sampling cycle, and when there is data to be transmitted to the computer 100, the request generating unit 308 generates the request message C or the response message B including the data to be transmitted to the GW device 200.

The request processing unit 310 stores the data of the request message B in the memory (the work data portion) 309.

The reception processing unit 311 stores the data of the response message C in the memory (the work data portion) 309.

The serial number allocating unit 312 allocates a serial number to the request message C or the response message B generated by the request generating unit 308.

When the request message C or the response message B to which the serial number is allocated by the serial number allocating unit 312 is the temporary communication, the temporary flag allocating unit 313 allocates the temporary flag to the request message C or the response message B.

The transmitting unit 314 transmits the request message C or the response message B which is generated to the control monitoring LAN 500.

The request analyzing unit 315 anal yes content of the communication message acquired by the receiving unit 316, transfers the communication message to the request processing unit 310 when the content is the request message B, and transfers the communication message to the reception processing unit 311 when the content is the response message C.

The receiving unit 316 receives the request message B or the response message C from the control monitoring LAN 500.

Figure 7:
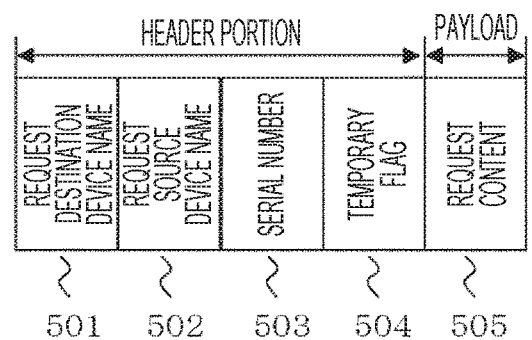
FIG. 7 is a (diagram illustrating a format of a request message C transmitted from a control device 300 to a GW device 200.

FIG. 7 is a diagram illustrating a format of the request message C transmitted from the control device 300 to the GW device 200. The request message C includes a header portion and a payload.

The header portion of the request message C includes a request destination device name 501, a request source device name 502, a serial number 503, and a temporary flag 504. The request destination device name 501 is a computer name of a transmission destination of the request message C. The request source device name 502 is a device name of a transmission source of the request message C. The serial number 503 is a serial number of the request message C. The temporary flag 504 is a flag whether or not the request message C is the temporary communication.

The payload of the request message C includes request content 505. The request content 505 is content which the request source device name 502 requests the request destination device name 501 to do.

Figure 8:
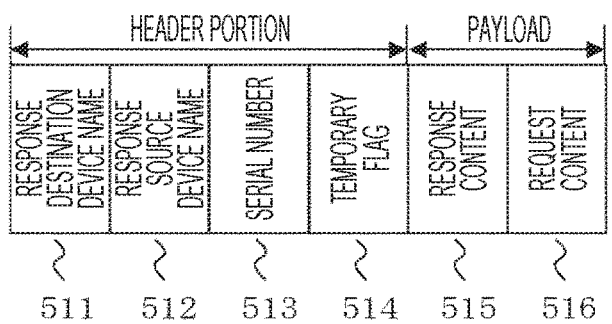
FIG. 8 is a diagram illustrating a format of a response message B transmitted from a control device 300 to a GW device 200.

FIG. 8 is a diagram illustrating a format of the response message B transmitted from the control device 300 to the GW device 200. The response message B includes a header portion and a payload.

The header portion of the response message B includes a response destination device name 511, a response source device name 512, a serial number 513, and a temporary flag 514.

The response destination device name 511 is a device name of a transmission destination of the response message C. The response source device name 512 is a device name of a transmission source of the response message C. The serial number 513 is a serial number of the response message C. The temporary flag 514 is a flag indicating whether or not the response message C is the temporary communication.

The payload of the response message C includes response content 515 and request content 516.

The response content 515 is content which the device of the response source device name 512 responds to the request content 516 from the device of the response destination device name 511. The request content 516 is content of a process which the device of the response (destination device name 511 requests the device of the response source device name 512 to perform.

Figure 9:
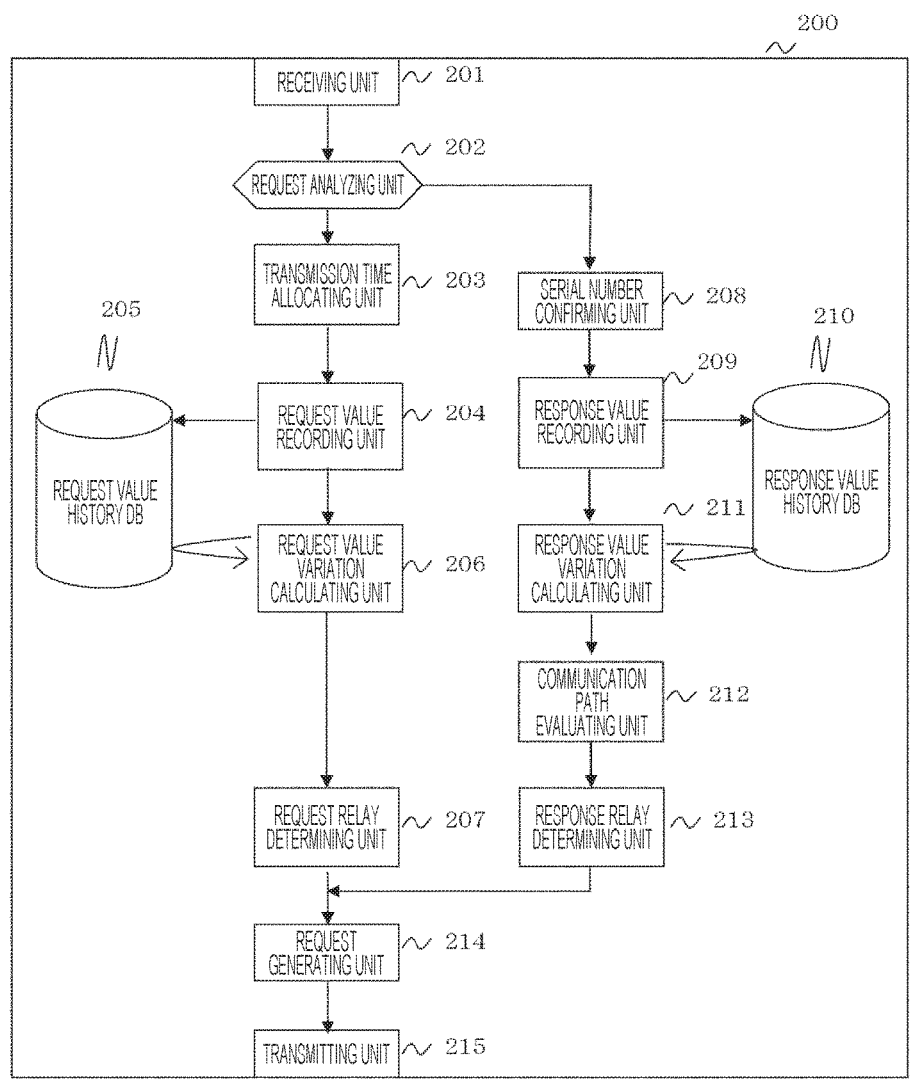
FIG. 9 is a block diagram illustrating an example of a functional configuration of a GW device 200.

FIG. 9 is a block diagram illustrating an example of a functional configuration of the GW device 200. The GW device 200 includes a receiving unit 201, a request analyzing, unit 202, a transmission time allocating unit 203, a request value recording unit 204, a request value history database (DB) 205, a request value variation calculating unit 206, a request relay determining unit 207, a serial number confirming unit 208, a response value recording, unit 209, a response value history database (TDB) 210, a response value variation calculating unit 211, a communication path evaluating unit 212, a response relay determining unit 213, a request generating unit 214, and a transmitting unit 215 as illustrated in FIG. 9.

The receiving unit 201 receives the request message A or the response message D transmitted from the LAN 400 or the request message C or the response message B transmitted from the control monitoring LAN 500.

The request analyzing unit 202 analyzes content of the communication message acquired by the receiving unit 201, transfers the communication message to the transmission time allocating unit 203 when the content is the request message A or the request message C, and transfers the communication message to the serial number confirming unit 208 when the content is the response message B or the response message D.

The transmission time allocating unit 203 allocates a current time to the communication message when the received communication message is the request message A.

When the received communication message is the request message A, the request value recording unit 204 records a combination of a history number 2051, a request time 2052, and a request value 2053 for each request source device name 402 up to five times. The combination may be recorded up to five times for each content of the request message A and each value of the temporary flag 404.

When the number of requests exceeds five times, a new record is overwritten on the oldest record. Here, the recording is performed up to five times, but the number of records may be changed as necessary.

When the received communication message is the request message A, the request value variation calculating unit 206 acquires the values 2053 of history numbers 1 to 5 from the request value history DB 205, and calculates an average value of variations of values (differences between a previous value and a current value) of requests in time series (the differential average value). Since the difference between the previous value and the current value indicates, for example, a current control amount in control, when a value of the difference is large, it indicates that an attempt to perform abrupt control is made. For example, when the values of the history numbers 1 to 5 are 10, 20, 50, 70, and 90, the variations of the values (differences between a previous value and a current value) are 10, 30, 20, and 20, and the average value of the variations of the values is 20. At this time, the request value 2053 corresponding to the content of the request of the request message A and the value of the temporary flag may be acquired.

When the received communication message is the request message A, the request relay determining unit 207 compares the average value of the calculation result obtained by the request value variation calculating unit 206 with a threshold value (a differential average threshold value) which is set in advance. When the average value exceeds the threshold value, since the request source is considered to be abnormal, the request relay determining unit 207 determines that the request is not relayed, and discards the request message A, whereas when the average value does not exceed the threshold value, the request relay determining unit 207 determines that the request is relayed, and transfers the communication message to the request generating unit 214. At this time, even when the performance flag of the response message D is true, the request relay determining unit 207 may discard the response message D. The threshold value may be set for each content of the request of the request message A and each value of the temporary flag.

The serial number confirming unit 208 confirms the serial number of the response message B or the response message D, and sets a value of a serial number loss flag to true when the serial numbers are not consecutive or when there is a lost packet.

When the received communication message is the response message D, the response value recording unit 209 associates each response source device name 412 with, for example, a request type, and records a response time 2102 and a response value 2103 up to five times in the past. When the number of responses exceeds five, a new record is overwritten on the oldest record. Here, the recording is performed up to five times, but the number of records may be changed as necessary. The recording may be performed up to five times for each content of the request message A corresponding to the response message D and the value of the temporary flag 415.

When the received communication message is the response message D, the response value variation calculating unit 211 acquires the response values 2103 of the history numbers 1 to 5 from the response value history DB 210, and calculates the average value of variations in time series. For example, when the acquired response values are 10, 20, 50, 70, and 90 in order from the history number 1, variations (differences) of the values are 10, 30, 20, and 20, and the average value of the variations of the values is 20. At this time, the response value 2103 corresponding to the content of the request message corresponding to the response message D and the value of the temporary nag may be acquired.

When the response message D is received, the communication path evaluating unit 212 obtains a difference between the transmission time 416 of the response message D and the current time (reception time), compares the difference with a predetermined threshold value (a communication period of time threshold value), and evaluates the state of the communication path to be unstable when the difference exceeds the threshold value.

The response relay determining unit 213 regards the response transmission source to be abnormal when the received communication message is the response message D, and the communication path evaluating unit 212 evaluates the state of the communication path to be unstable or when the response value variation calculating unit 211 compares the calculated average value with a previously set threshold value, and the average value exceeds the threshold value. Thus, the response relay determining unit 213 determines that the response is not relayed, and discards the response message D. Further, when the state of the communication path is determined not to be unstable, and the average value calculated by the response value variation calculating unit 211 does not exceed the threshold value, the response relay determining unit 213 determines that the response is relayed, and transfers the response to the request generating unit 214. At this time, when the performance flag of the request message A is true, the response relay determining unit 213 may discard the request message A. The threshold value may be set for each content of the request of the request message A corresponding to the response message and each value of the temporary flag.

The request generating unit 214 generates the request message D or the response message A transmitted from the GW device 200 to the computer 100 or the request message B or the response message C transmitted from the GW device 200 to the control device 300 based on the message received from the response relay determining unit 213.

The transmitting unit 215 transmits the request message D or the response message A and the request message B or the response message C generated by the request generating unit 214.

Figure 10:
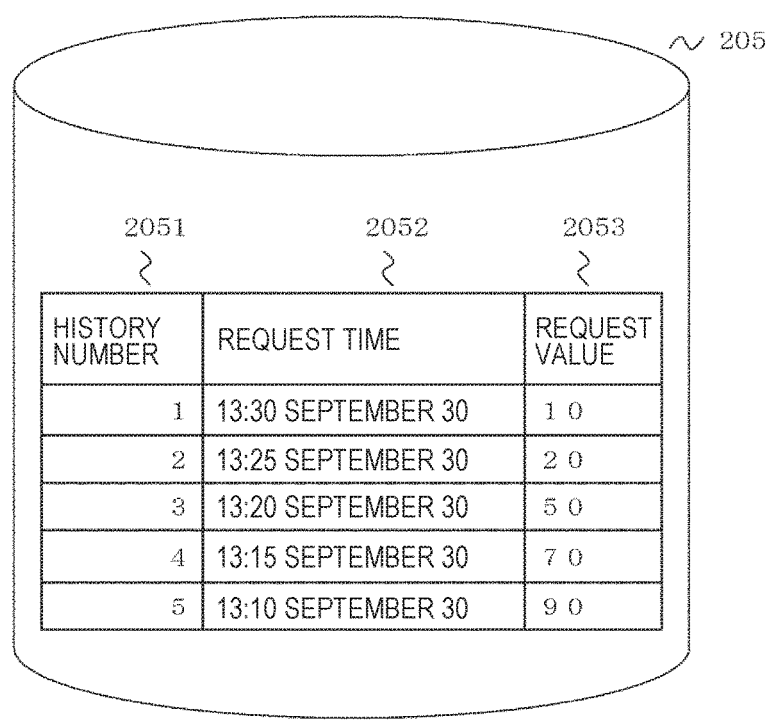
FIG. 10 is a diagram illustrating an example of a request value history DB 205.

FIG. 10 is a diagram illustrating an example of the request value history DB 205. The request value history DB 205 includes the history number 2051, the request time 2052, and the request value 2053 as illustrated in FIG. 10.

The history number 2051 includes consecutive numbers. Here, a number 1 indicates the latest record, and a largest number indicates an oldest number. The request time 2052 indicates a time at which the request value recording unit 204 receives the request message A. The value 2053 indicates a value (request value) included in the request content 405 of the request message A. One history number 2051, one request time 2052, and one request value 2053 are managed as a set.

Figure 11:
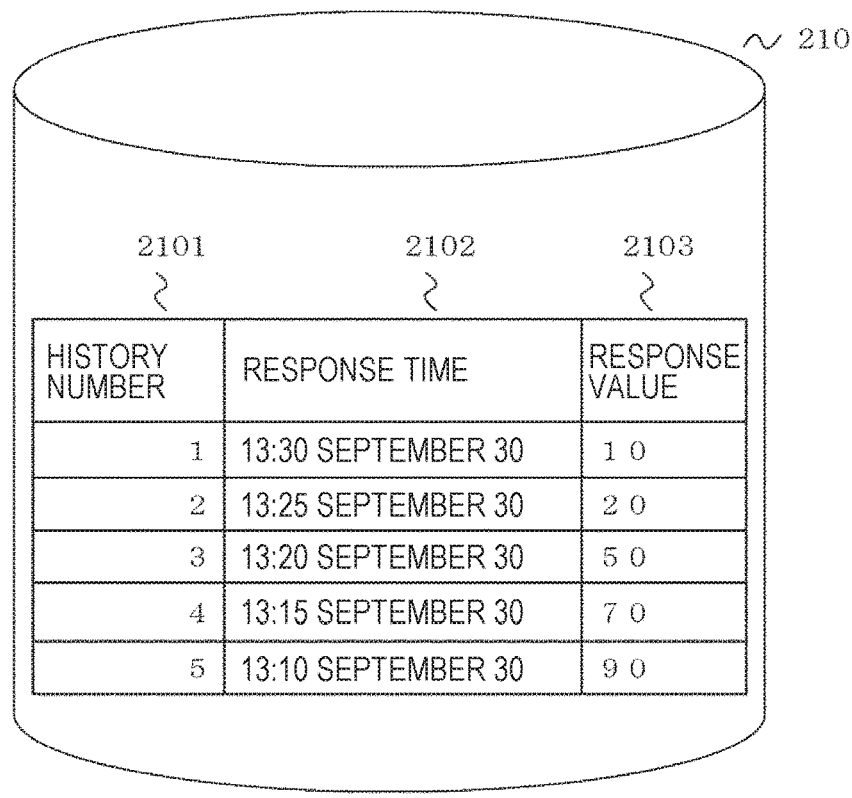
FIG. 11 is a diagram illustrating an example of a response value history DB 210.

FIG. 11 is a diagram illustrating an example of the response value history DB 210. The response value history DB 210 includes a history number 2101, the response time 2102, and the response value 2103 as illustrated in FIG. 11.

The history number 2101 includes consecutive numbers. Here, a number 1 indicates the latest record, and a largest number indicates an oldest number. The response time 2102 is a time at which the response value recording unit 209 receives the response message D. The value 2103 indicates a value (response value) included in the response content 417 of the response message D. One history number 2101, one response time 2102, and one value 2103 are managed as a set.

Figure 12:
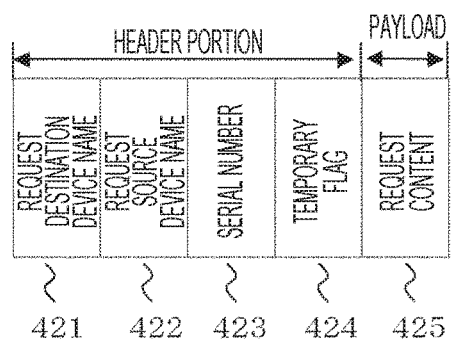
FIG. 12 is a diagram illustrating a format of a request message D transmitted from a GW device 200 to a computer 100.

FIG. 12 is a diagram illustrating a format of the request message D transmitted from the GW device 200 to the computer 100. The request message D includes a header portion and a payload.

The header portion of the request message D includes a request destination device name 421, a request source device name 422, a serial number 423, and a temporary flag 424.

The request destination device name 421 is a device name of a request destination of the request message D and the same as the request destination device name 501 of the request message C. The request source device name 422 is a device name of a request source of the request message D and the same as the request source device name 502 of the request message C. The serial number 423 is a serial number of the request message D and the same as the serial number 503 of the request message C. The temporary flag 424 is a flag indicating whether or not the request message D is the temporary communication and the same as the temporary flag 504 of the request message C.

The payload of the request message D includes request content 425.

The request content 425 is content which the request source device name 422 requests the request destination device name 421 to do and the same as the request content 505 of the request message C.

Figure 13:
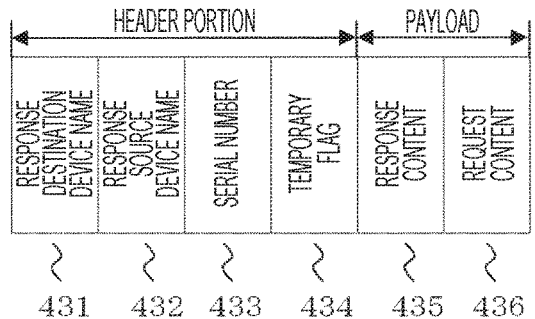
FIG. 13 is a diagram illustrating a format of a response message A transmitted from a GW device 200 to a computer 100.

FIG. 13 is a diagram illustrating a format of the response message A transmitted from the GW device 200 to the computer 100. The response message A includes a header portion and a payload.

The header portion of the response message A includes a response destination device name 431, a response source device name 432, a serial number 433, and a temporary flag 424.

The response destination device name 431 is a device name of a response destination of the response message A and the same as the response destination device name 511 of the response message B. The response source device name 432 is a device name of a response source of the response message B and the same as the response source device name 512 of the response message B. The serial number 433 is a serial number of the response message A and the same as the serial number 513 as the response message B. The temporary flag 434 is a flag indicating whether or not the response message A is the temporary communication and the same as the temporary flag 514 of the response message B.

The payload of the response message A includes response content 435 and request content 436.

The response content 435 is content which the response source device name 432 responds to the response destination device name 431 and the same as the response content 515 of the response message B. The request content 436 is content which the response destination device name 431 requests the response source device name 432 to do and the same as request content 537 as the response message B.

Figure 14:
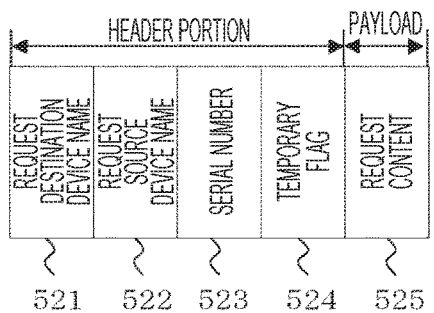
FIG. 14 is a diagram illustrating a format of a request message B transmitted from a GW device 200 to a control device 300.

FIG. 14 is a diagram illustrating a format of the request message B transmitted from the GW device 200 to the control device 300. The request message B includes a header portion and a payload.

The header portion of the request message B includes a request destination device name 521, a request source device name 522, a serial number 523, and a temporary flag 524.

The request destination device name 521 is a device name of a request destination of the request message B and the same as the request destination device name 401 of the request message A. The request source device name 522 is a device name of a request source of the request message B and the same as the request source device name 402 of the request message A. The serial number 523 is a serial number of the request message B and the same as the serial number 403 of the request message A. The temporary flag 524 is a flag indicating whether or not the request message B is the temporary communication and the same as the temporary flag 404 of the request message A.

The payload of the request message B includes request content 525.

The request content 525 is content which the request source device name 522 requests the request destination device name 521 to do and the same as the request content 405 of the request message A.

Figure 15:
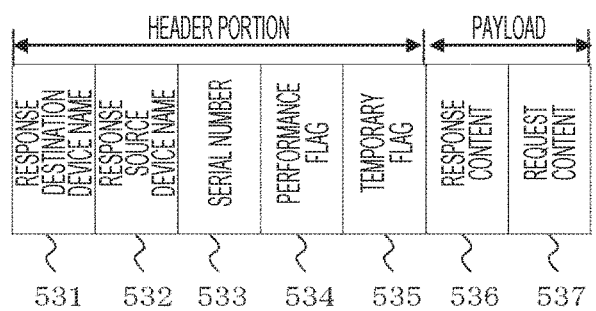
FIG. 15 is a diagram illustrating a format of a response message C transmitted from a GW device 200 to a control device 300.

FIG. 15 is a diagram illustrating a format of the response message C transmitted from the GW device 200 to the control device 300. The response message C includes a header portion and a payload.

The header portion of the response message C includes a response destination device name 531, a response source device name 532, a serial number 533, a performance flag 534, and a temporary flag 535.

The response destination device name 531 is a device name of a response destination of the response message C and the same as the response destination device name 411 of the response message D. The response source device name 532 is a device name of a response source of the response message C and the same as the response source device name 412 of the response message D. The serial number 533 is a serial number of the response message C and the same as the serial number 413 of the response message D. The performance flag 534 is a flag indicating whether or not it is in a high load state when the response source device name 532 processes request content 537 and the same as the performance flag 414 of the response message D. The temporary flag 535 is a flag indicating whether or not the response message C is the temporary communication and the same as the temporary flag 415 of the response message D.

The payload of the response message C includes response content 536 and request content 537.

The response content 536 is content which the response source device name 532 responds to the response destination device name 531 and the same as the response content 417 of the response message B. The request content 537 is content which the response destination device name 531 requests the response source device name 532 to do and the same as the request content 418 of the response message D.

The above-described embodiment of the present invention is an example for describing the present invention, and the scope of the present invention is not limited to the above embodiment. Those having skill in the art can implement the present invention in other various forms without departing from the gist of the present invention.

REFERENCE SIGN LIST 1 communication network system
10 information system
100 computer
101 receiving unit
102 request generating unit
103 performance measuring unit
104 serial number allocating unit
105 temporary flag allocating unit
106 transmitting unit
107 request processing unit
108 external IF unit
109 reception processing unit
110 request analyzing unit
111 receiving unit
20 control system
200 GW device
200 device
201 receiving unit
202 request analyzing unit
203 transmission time allocating unit
204 request value recording unit
205 request value history DB
2051 history number
2052 request time
2053 request value
206 request value variation calculating unit
207 request relay determining unit
208 serial number confirming unit
209 response value recording unit
210 response value history DB
2101 history number
2102 response time
2103 response value
211 response value variation calculating unit
212 communication path evaluating unit
213 response relay determining unit
214 request generating unit
215 transmitting unit
300 control device
305 process input processing unit
306 control monitoring calculating unit
307 process output processing unit
308 request generating unit
310 request processing unit
311 reception processing unit
312 serial number allocating unit
313 temporary flag allocating unit
314 transmitting unit
315 request analyzing unit
316 receiving unit
400 LAN
401 request destination device name
402 request source device name
403 serial number
404 temporary flag
405 request content
411 response destination device name
412 response source device name
413 serial number
414 performance flag
415 temporary flag
416 transmission time
417 response content
418 request content
421 request destination device name
422 request source device name
423 serial number
424 temporary flag
425 request content 431 response destination device name
432 response source device name
433 serial number
434 temporary flag
435 response content
436 request content
50 control monitoring LAN
500 control monitoring LAN
501 request destination device name
502 request source device name
503 serial number
504 temporary flag
505 request content
511 response destination device name
512 response source device name
513 serial number
514 temporary flag
515 response content
516 request content
521 request destination device name
522 request source device name
523 serial number
524 temporary flag
525 request content
531 response destination device name
532 response source device name
533 serial number
534 performance flag
535 temporary flag
536 response content
537 request content

The invention claimed is:

1. A control system comprising:
a control device that performs at least one of control and monitoring of a control target;
a computer that performs a process related to the control or the monitoring; and
a gateway device that relays a communication message between the control device and the computer,
wherein when a first communication message is received from the computer, the gateway device acquires a predetermined state index related to the first communication message, determines whether or not a predetermined execution condition is satisfied based on the state index, transmits a second communication message to the control device based on the received first communication message when the execution condition is satisfied, and does not transmit the second communication message to the control device when the execution condition is not satisfied, and
wherein the gateway device sets a differential average threshold value serving as a threshold value for a differential average value serving as an average value of a predetermined number of previous differences between a previous state index and a current state index in advance, and when the first communication message is received from the computer, the gateway device acquires the state index, records the state index in a history database, calculates the differential average value of the state index using information recorded in the history database, and determines the execution condition to be satisfied when the differential average value does not exceed the differential average threshold value.

2. A control system comprising:
a control device that performs at least one of control and monitoring of a control target;
a computer that performs a process related to the control or the monitoring; and
a gateway device that relays a communication message between the control device and the computer,
wherein when a first communication message is received from the computer, the gateway device acquires a predetermined state index related to the first communication message, determines whether or not a predetermined execution condition is satisfied based on the state index, transmits a second communication message to the control device based on the received first communication message when the execution condition is satisfied, and does not transmit the second communication message to the control device when the execution condition is not satisfied, and
wherein the gateway device measures a communication period of time serving as a period of time until a first communication message serving as a response communication message to a third communication message is received from the computer after the third communication message is transmitted to the computer as the state index, determines the execution condition to be satisfied when the communication period of time does not exceed a predetermined communication period of time threshold value, and determines the execution condition to be satisfied when the communication period of time exceeds the communication period of time threshold value.

3. The control system according to claim 2,
wherein the control device transmits a fourth communication message to which an exclusion flag is added to the gateway device, and when the gateway device detects the exclusion flag, the gateway device transmits the second communication message to the control device regardless of whether or not the communication period of time from transmission of the third communication message based on the fourth communication message to reception of the first communication message exceeds the communication period of time threshold value.

4. A control system comprising:
a control device that performs at least one of control and monitoring of a control target;
a computer that performs a process related to the control or the monitoring; and
a gateway device that relays a communication message between the control device and the computer,
wherein when a first communication message is received from the computer, the gateway device acquires a predetermined state index related to the first communication message, determines whether or not a predetermined execution condition is satisfied based on the state index, transmits a second communication message to the control device based on the received first communication message when the execution condition is satisfied, and does not transmit the second communication message to the control device when the execution condition is not satisfied, and
wherein the computer measures a processing load amount applied to the computer when the first communication message is generated, and when the processing load amount exceeds a predetermined processing load threshold value, the computer adds a performance flag to the first communication message as the state index, transmits the first communication message including the performance flag to the gateway device, and the gateway device determines the execution condition not to be satisfied when the first communication message is received, and the performance flag is detected.

5. The control system according to claim 4,
wherein the processing load amount is a CPU usage rate, and
the processing load threshold value is a CPU usage rate threshold value serving as a threshold value of the CPU usage rate.

6. A gateway device used in a control system including a control device that performs at least one of control and monitoring of a control target, a computer that performs a process related to the control or the monitoring, and a gateway device that relays a communication message between the control device and the computer, the gateway device comprising:
a receiving/acquiring unit that acquires a predetermined state index related to a first communication message when the first communication message is received from the computer;
an evaluating/determining unit that determines whether or not a predetermined execution condition is satisfied based on the state index; and
a generating/transmitting unit that transmits a second communication message based on the received first communication message to the control device when the execution condition is satisfied, and does not transmit the second communication message to the control device when the execution condition is not satisfied;
wherein the evaluating/determining unit sets a differential average threshold value serving as a threshold value for a differential average value serving as an average value of a predetermined number of previous differences between a previous state index and a current state index in advance, and when the first communication message is received from the computer, the gateway device acquires the state index, records the state index in a history database, calculates the differential average value of the state index using information recorded in the history database, and determines the execution condition to be satisfied when the differential average value does not exceed the differential average threshold value.

7. A gateway device used in a control system including a control device that performs at least one of control and monitoring of a control target, a computer that performs a process related to the control or the monitoring, and a gateway device that relays a communication message between the control device and the computer, the gateway device comprising:
a receiving/acquiring unit that acquires a predetermined state index related to a first communication message when the first communication message is received from the computer;
an evaluating/determining unit that determines whether or not a predetermined execution condition is satisfied based on the state index; and
a generating/transmitting unit that transmits a second communication message based on the received first communication message to the control device when the execution condition is satisfied, and does not transmit the second communication message to the control device when the execution condition is not satisfied;
wherein the evaluating/determining unit measures a communication period of time serving as a period of time until a first communication message serving as a response communication message to a third communication message is received from the computer after the third communication message is transmitted to the computer as the state index, determines the execution condition to be satisfied when the communication period of time does not exceed a predetermined communication period of time threshold value, and determines the execution condition not to be satisfied when the communication period of time exceeds the communication period of time threshold value.

8. A control method of a control system including a control device that performs at least one of control and monitoring of a control target, a computer that performs a process related to the control or the monitoring, and a gateway device that relays a communication message between the control device and the computer, the control method comprising:
acquiring, by the gateway device, a predetermined state index related to a first communication message when the first communication message is received from the computer;
determining, by the gateway device, whether or not a predetermined execution condition is satisfied based on the state index;
transmitting, by the gateway device, a second communication message based on the received first communication message to the control device when the execution condition is satisfied; and
transmitting, by the gateway device, no second communication message to the control device when the execution condition is not satisfied;
wherein the gateway device sets a differential average threshold value serving as a threshold value for a differential average value serving as an average value of a predetermined number of previous differences between a previous state index and a current state index in advance, and when the first communication message is received from the computer, the gateway device acquires the state index, records the state index in a history database, calculates the differential average value of the state index using information recorded in the history database, and determines the execution condition to be satisfied when the differential average value does not exceed the differential average threshold value.

* * * * *